(12) United States Patent (10) Patent No.: US 12,597,835 B2
Ressel (45) Date of Patent: Apr. 7, 2026

(54) ROTOR HAVING A SQUIRREL CAGE

(71) Applicant: Innomotics GmbH, Nuremberg (DE)

(72) Inventor: Ekkehard Ressel, Heilsbronn (DE)

(73) Assignee: Innomotics GmbH, Nuremberg (DE)

( * ) Notice: Subject to any disclaimer, the term of this patent is extended or adjusted under 35 U.S.C. 154(b) by 560 days.

(21) Appl. No.: 17/926,488

(22) PCT Filed: Apr. 19, 2021

(86) PCT No.: PCT/EP2021/060028
§ 371 (c)(1),
(2) Date: Nov. 18, 2022

(87) PCT Pub. No.: WO2021/233617
PCT Pub. Date: Nov. 25, 2021

(65) Prior Publication Data
US 2023/0188019 A1 Jun. 15, 2023

(30) Foreign Application Priority Data

May 20, 2020 (EP) .................................... 20175725

(51) Int. Cl.
*H02K 17/16* (2006.01)
*B22D 19/00* (2006.01)
*H02K 15/023* (2025.01)

(52) U.S. Cl.
CPC ....... *H02K 17/168* (2023.05); *B22D 19/0054* (2013.01); *H02K 15/023* (2025.01); *H02K 17/16* (2013.01)

(58) Field of Classification Search
CPC ...... H02K 17/168; H02K 17/18; H02K 17/20; H02K 15/023

(Continued)

(56) References Cited

U.S. PATENT DOCUMENTS 1,823,337 A * 9/1931 Sheely ................. H02K 17/168
310/212
2,499,390 A * 3/1950 Joy ....................... H02K 17/168
29/598

(Continued)

FOREIGN PATENT DOCUMENTS

CN 209088651 U * 7/2019 ............... H02K 1/22
GB 2023459 A * 1/1980 .......... H02K 15/023
WO WO-2012137235 A1 * 10/2012 ........... H02K 15/023

OTHER PUBLICATIONS

PCT International Search Report and Written Opinion of International Searching Authority mailed Aug. 12, 2021 corresponding to PCT International Application No. PCT/EP2021/060028 filed Apr. 19, 2021.

*Primary Examiner* — Oluseye Iwarere
*Assistant Examiner* — Daniel K Schlak
(74) *Attorney, Agent, or Firm* — Henry M. Felereisen LLC

(57) ABSTRACT

A rotor of a rotary dynamoelectric machine incudes a magnetically conductive body, having substantially axially running slots distributed around the circumference. A squirrel cage includes electrical conductors which are arranged in the slots. The electrical conductors are electrically contacted at the two end faces of the rotor by short-circuit rings. The magnetically conductive body includes a base body and at least two further additional bodies, which axially adjoin the base body. A first one of the at least two additional bodies directly axially adjoins the end face of the base body, and a second one of the at least two additional bodies and optionally any further additional body axially adjoin the first additional body. The slots have radially exposed slot portions in the axial end regions of the rotor such that the conductors can be moved radially outward.

8 Claims, 5 Drawing Sheets

(58) Field of Classification Search
USPC .................................................. 310/125, 211
See application file for complete search history.

(56) References Cited

U.S. PATENT DOCUMENTS

| | | | | |
|---|---|---|---|---|
| 2,784,333 | A * | 3/1957 | Gunselman | H02K 17/20 164/109 |
| 2,844,748 | A * | 7/1958 | Hutchins | H02K 3/20 310/212 |
| 3,045,135 | A * | 7/1962 | Honsinger | H02K 19/14 310/212 |
| 3,246,188 | A * | 4/1966 | Mcgarvey | H02K 3/16 310/183 |
| 3,335,308 | A * | 8/1967 | Robinson | H02K 17/18 310/211 |
| 3,375,385 | A * | 3/1968 | Young | H02K 17/168 310/182 |
| 3,401,280 | A * | 9/1968 | Lackey | H02K 17/20 428/676 |
| 3,936,685 | A * | 2/1976 | Glockner | H02K 7/125 310/211 |
| 3,965,380 | A * | 6/1976 | Stepina | H02K 7/125 310/212 |
| 4,197,975 | A * | 4/1980 | Williamson | H02K 15/023 29/598 |
| 4,341,966 | A | 7/1982 | Pangburn | |
| 5,990,595 | A * | 11/1999 | Crowell | H02K 17/20 310/211 |
| 2003/0184185 | A1 | 10/2003 | Yoshino et al. | |
| 2006/0273683 | A1 * | 12/2006 | Caprio | H02K 17/168 310/211 |
| 2007/0210667 | A1 * | 9/2007 | Vogel | B22D 19/0054 310/211 |
| 2008/0185934 | A1 * | 8/2008 | Verhoeven | H02K 17/16 310/211 |
| 2011/0080067 | A1 * | 4/2011 | Fukuda | H02K 17/168 29/598 |
| 2022/0123636 | A1 * | 4/2022 | Galmiche | H02K 17/20 |

* cited by examiner

ROTOR HAVING A SQUIRREL CAGE

CROSS-REFERENCES TO RELATED APPLICATIONS

This application is the U.S. National Stage of International Application No. PCT/EP2021/060028, filed Apr. 19, 2021, which designated the United States and has been published as International Publication No. WO 2021/233617 A1 and which claims the priority of European Patent Application, Serial No. 20175725.9, filed May 20, 2020, pursuant to 35 U.S.C. 119 (a)-(d).

BACKGROUND OF THE INVENTION

The invention relates to a rotor with squirrel cage, as well as a dynamoelectric machine with a rotor of this kind. The invention further relates to a method for producing a rotor with squirrel cage of this kind.

Rotors with squirrel cages of dynamoelectric machines, in particular asynchronous motors, are produced in a cost-effective manner with a cast rotor winding. In this context, short-circuit rings lie against the ends of the rotor laminated core and are permanently connected to the conductor bars inter alia in a mechanical and electrically conductive manner.

Due to thermal expansion and/or centrifugal force loads during operation of the dynamoelectric machine, the short-circuit rings extend radially more than the laminated core of the rotor with the bars cast in. In this context, shear stresses occur at the connection between the conductor bar and short-circuit ring. The amount of said shear stress restricts the maximum possible rotary speed and the maximal permissible temperature of the dynamoelectric machines.

Cap rings on the outer circumference of the short-circuit rings for achieving higher rotary speeds are not suitable, or only suitable to a limited extent, as the shear stresses caused by heat inter alia cannot be avoided thereby.

If the permissible dimensioning limits are exceeded, the cast cage winding can no longer be used as a result.

For this reason, cage windings, also referred to as shading coils, are manufactured from individually introduced bars and soldered-on or welded-on short-circuit rings. Due to the manufacturing method, these windings have an axial bar overhang on the end face of the laminated core, which enables a thermal expansion of the short-circuit rings and thus higher rotary speeds and/or a higher temperature. The use of cap rings in these dynamoelectric machines enables a further increase in the rotary speed.

Based on this, the object underlying the invention is to create a rotor of a dynamoelectric machine with a squirrel cage, which is simple to produce and is suitable for higher rotary speeds that are comparatively high. Additionally, a corresponding dynamoelectric machine is to be provided.

SUMMARY OF THE INVENTION

The set object is achieved by a rotor of a rotary dynamoelectric machine, wherein the rotor has the following features:

- at least one magnetically conductive body with slots that are distributed around the circumference and substantially run axially,
- at least one squirrel cage with electrical conductors that are arranged in slots and are in each case electrically contacted on the two end faces of the rotor by means of allocated short-circuit rings, the magnetically conductive body has a base body and, at least on each end face, has at least two further additional bodies, which connect axially to the base body, wherein a first additional body connects axially directly to the end face of the base body and in each case a second and if applicable further additional bodies connect axially thereto, radially exposed slots or slot sections in the axial end regions of the rotor, in such a manner that it is made possible for the conductors to move radially outward.

The set object is also achieved by a method for producing a rotor of a rotary dynamoelectric machine with a squirrel cage by way of the following steps;

- producing a magnetically conductive body with slots that are distributed around the circumference and substantially run axially,
- producing the squirrel cage with electrical conductors that are arranged in the slots and are in each case electrically contacted on the two end faces of the rotor by means of short-circuit rings,
- removing material starting axially from the end faces of the rotor on the radially outer edge, such that the conductors in this region are exposed, in such a manner that it is made possible for the conductors to move radially.

The magnetically conductive body has a base body and, at least on each end face, has at least two further additional bodies, which connect axially to the base body. In this context a first additional body connects axially directly to the end face of the base body and in each case a second and if applicable further additional bodies connect axially thereto. The first additional body is a disk or plate, which is predominantly adapted to the contours of the base body.

In order to now enable, according to the invention, a thermal expansion of the short-circuit rings in relation to the laminated core during operation of the dynamoelectric machine, the slots, in particular on the ends of the laminated core, are designed in sections in the first additional body, on the second and if applicable further additional bodies such that the bars are able to move radially outward.

To this end, there is provision at the ends of the magnetically conductive body, in particular in the second and further additional bodies, for a slot geometry which has no undercuts and therefore has parallel flanks or widens outward. In other words, the slot walls have parallel flanks or increase their distance from one another as they run radially outward.

In low-pressure casting methods, this slot geometry can be designed as closed or open. In this context, the casting shell takes over the sealing off of the slot geometry that is radially open to the outside or of the conductors. The second and further additional bodies, i.e. the region of the open bars or conductors, can be designed as laminated or with solid plates, which have a multiple of the sheet thickness (5 to 20 times). The material of the plate may also be designed as identical to that of the sheet or—from an electrotechnical perspective—with a lower value.

In the case of medium-pressure and high-pressure casting methods for producing the conductors, a closed slot is (initially) required due to the production method. In the case of the closed slot, the bars or conductors are then exposed on the core ends by lathing the outer diameter. Thus, a slot geometry without undercuts is likewise created, which allows radial movement due to thermal effects and/or centrifugal forces. In other words, the slot walls are designed as parallel or with an opening angle there.

Since the electrical sheets are usually designed with a thickness of 0.5 mm or 0.65 mm, without the first additional body, segments that are turned to different extents or even torn out would otherwise occur at the end of the relief.

This is achieved according to the invention in that a disk or plate with corresponding axial thickness connects to the base body as first additional body such that the relief ends in the homogeneous material of this disk, i.e. the first additional body.

The region between the short-circuit ring and the first additional body, i.e. the disk, at the end of the relief can be designed both as laminated and/or also as solid. In any case, the slot geometry has to correspond to the criteria mentioned above.

In other words, the second and further additional bodies may be designed both as laminated and also as solid.

To further increase the rotary speed of the dynamoelectric machines, cap rings may additionally be used on the outer circumference of the short-circuit rings. Depending on the targeted rotary speed level of the dynamoelectric machines, these are only present in the region of the short-circuit rings or also have an additional coverage of the bars in the region of the radially open slots.

The cost-effective production method for a cast squirrel cage of a rotor can thus according to the invention now also be provided for higher rotary speeds of a dynamoelectric machine. In this context, the short-circuit rings lie directly against the end face of the magnetically conductive body. This also reduces the axial protrusion of the rotor, meaning that a compact dynamoelectric machine is created.

The advantage lies in particular in the use of aluminum die casting technology and centrifugal casting technology compared to a conventionally manufactured copper rotor.

According to the invention, the use of casting technology, with the design of the slot ends according to the invention, at the ends of the magnetically conductive body now leads to conductors or bars that are able to move radially, in order to allow radial movements due to thermal effects and/or centrifugal forces.

By additionally using cap rings, rotors of this kind are suitable for even higher rotary speed ranges of the dynamo-electric machine.

BRIEF DESCRIPTION OF THE DRAWING

The invention and further embodiments of the invention will now be explained in greater detail on the basis of schematic representations of exemplary embodiments; in which;

FIGS. 3, 4 show further partial longitudinal sections of squirrel cage rotors,

DETAILED DESCRIPTION OF PREFERRED EMBODIMENTS

Figure 1:
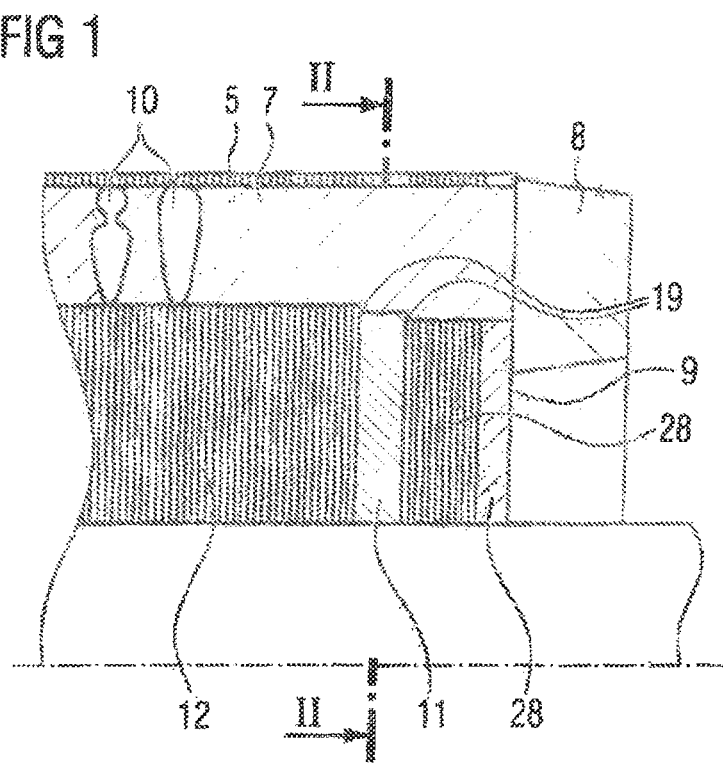
FIG. 1 shows a partial longitudinal section of a squirrel cage rotor.

FIG. 1 shows a partial longitudinal section of a rotor 5, which is embodied as a squirrel cage rotor and which has a magnetically conductive body, with slots 10 that are distributed around the circumference and substantially run axially. The different slot shapes shown in this figure are exemplary and may also be designed in a different manner.

The magnetically conductive body has a base body 12, and a plurality of additional bodies 11, 28 that are arranged in axial succession.

A squirrel cage 6 with electrical conductors 7 that are arranged in slots 10 is provided in the magnetically conductive body. The electrical conductors 7 are in each case electrically contacted on the two end faces 9 of the rotor 5 by means of allocated short-circuit rings 8.

In this context, the conductors 7 in the slots 10 are generated through the use of aluminum die casting technology or centrifugal casting technology or by premanufactured conductor bars. In the case of the casting technologies, the short circuit ring 8 is also cast. In the case of premanufactured conductor bars, at a subsequent electrical contacting between the conductor bars and a premanufactured short-circuit ring 8 is necessary, at least on one end face.

In this state, although the squirrel cage rotor is already functional in principle, during operation of the dynamoelectric machine, thermal loads and/or centrifugal force loads however, as stated above, cause damaging shear stresses at the connecting point between conductors 7 arranged in the slots 10 and the short-circuit rings 8.

The additional bodies 11, 28 connecting axially to the base body 12 are embodied as disks in the first additional body 11 and as disks and/or partial laminated cores in the following additional bodies 28.

In addition to squirrel cage 6, the rotor 5 may also have further torque-generating features, such as reluctance rotors and/or permanent magnets. This then allows the dynamic electric machine to start up directly on the electrical network without the interconnection of a converter.

The base body 12 is preferably designed as laminated and the first additional body 11 connects axially thereto. Further disks and/or a partial laminated core connect axially thereto.

In the axial direction, the conductor 7 has at least one step 19, which is represented as an increase in the cross-section in the first additional body 11 and as a further increase in the cross-section in the further additional bodies 28. This increases the stability.

The short-circuit ring 8 protrudes radially inward on the end face 9 of the axially last additional body 28 and lies against the end face 9.

Figure 2:
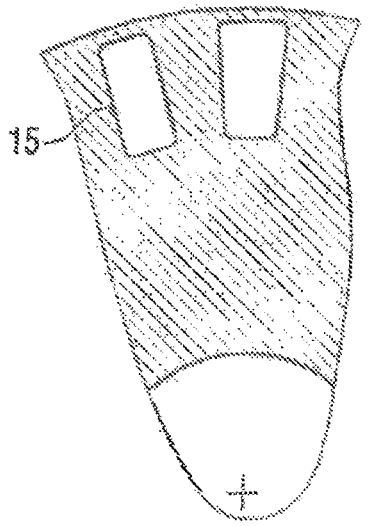
FIG. 2 shows a partial transverse section of a squirrel cage rotor.

The shape of the slots 10 in the base body 12 can be designed in almost any given manner. In the additional bodies 28, however, the slot walls 15 of the slots 10 according to FIG. 2 have parallel flanks or are designed as open slot walls with a slight opening angle. Thus, it is now possible according to the invention, by lathing the radially outer boundary up to conductor 7 from the disk and/or the partial laminated core, for radial movement of the conductors 7 radially outward to take place in the additional bodies 28 during operation of the electric machine.

Figure 3:
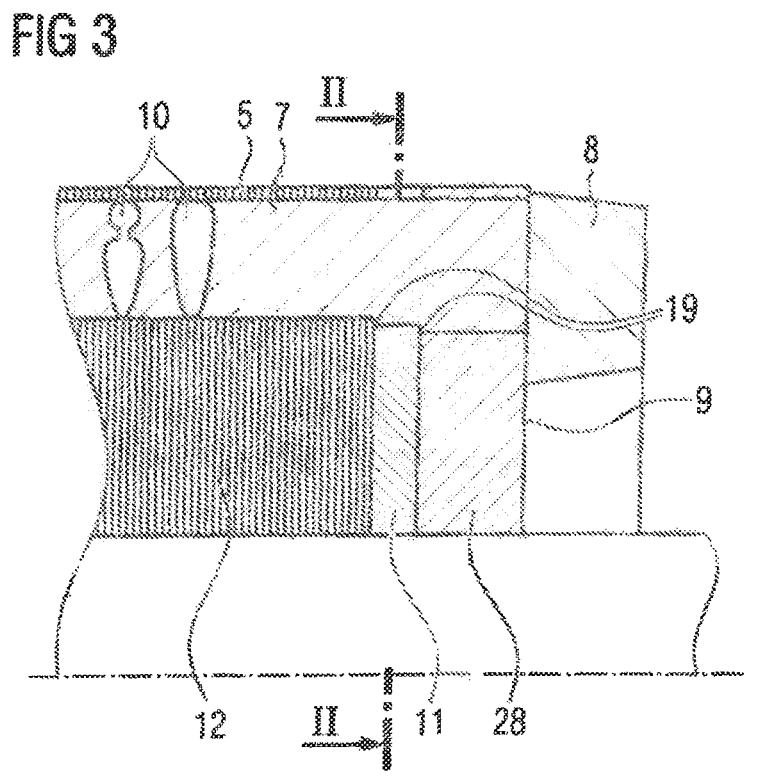
Figure 4:
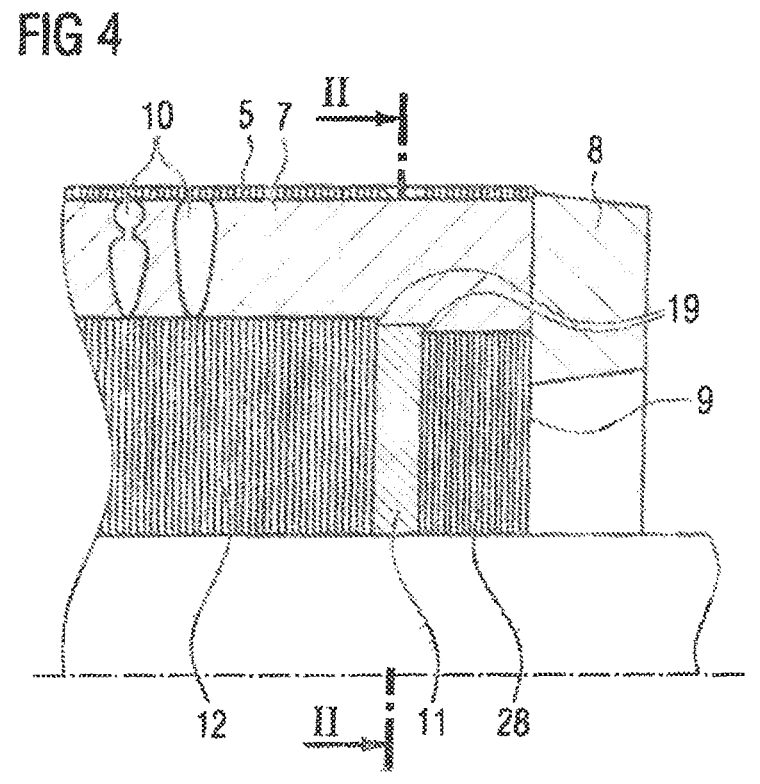

FIGS. 3, 4 differ in the design of the further additional body 28. In one case, the second additional body 28 is also a disk. In FIG. 4, the further additional body 28 is a partial laminated core. In FIG. 1, the further additional bodies 28 are a disk and a partial laminated core. All these embodiments have in common that the first additional body 11 is designed as a disk. In this context, this disk corresponds in its axial thickness to the multiple (4 to 15 times) of a sheet thickness.

The key point is that, during lathing, the process of material removal ends axially within the disk of the first additional body 11. The lathed section 17 extends axially from the outer side of the short-circuit ring 8 until reaching the first additional body 11.

The relief or the material removal thus ends in the homogeneous material of said disk or plate with corresponding axial thickness, which connects to the base body as first additional body.

The axial material removal is not permitted to finish before then, as this would otherwise end in the partial laminated core, if applicable, which leads to sheets that are turned to different extents or even to sheet segments that are torn out.

The radial ends of the conductors 7 are thus axially exposed in the further additional bodies 28 and are only partially axially exposed in the first additional body 11.

Figure 5:
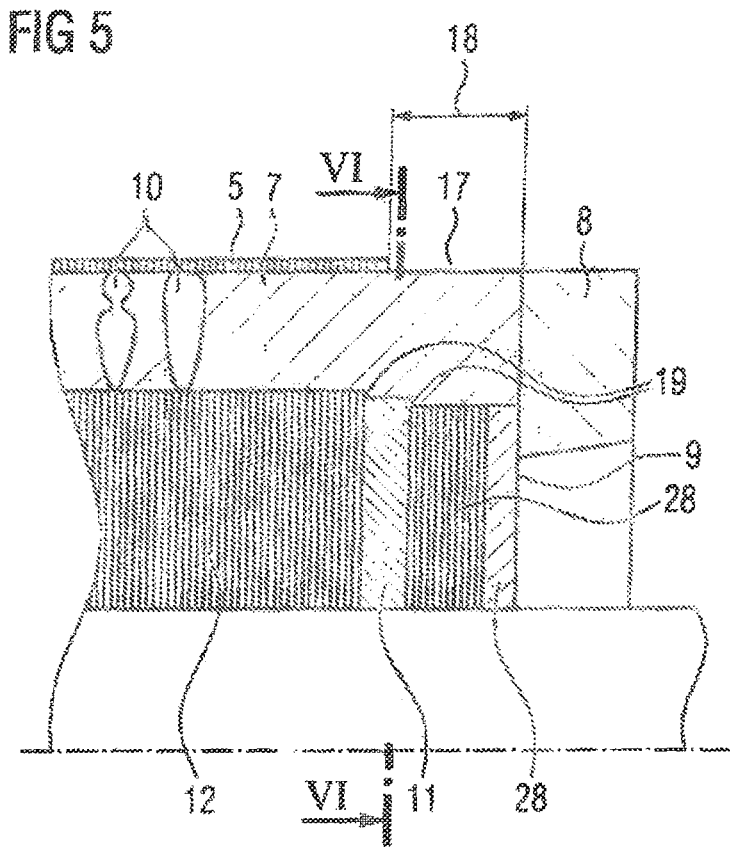
FIG. 5 shows a machined partial longitudinal section of a squirrel cage rotor.

FIG. 5 shows a partial longitudinal section of the squirrel cage rotor according to FIG. 1 after machining. In this context, starting axially from the short-circuit ring 8, the tooth tip connections have been lathed in the region of the slots 10 of the last additional body 28 and partially of the first additional body 11.

According to the invention, this now allows the short-circuit ring 8 to move radially to the side, even with thermal load, without shear stresses being generated at the connecting point to the conductors 7.

Figure 6:
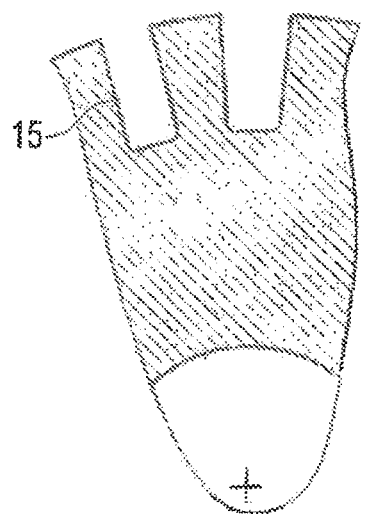
FIG. 6 shows a partial transverse section of a squirrel cage rotor.

Due to the design of the slot shapes in the additional bodies 28, 11 according to FIG. 6, the conductor 7 is able to move radially.

Figure 7:
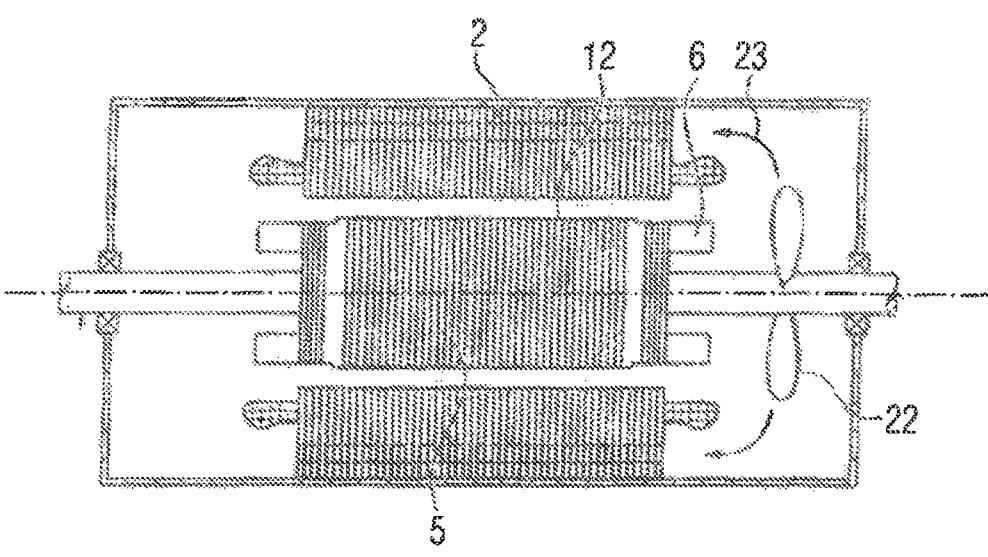
FIGS. 7, 8 show schematic longitudinal sections of dynamoelectric machines.
Figure 8:
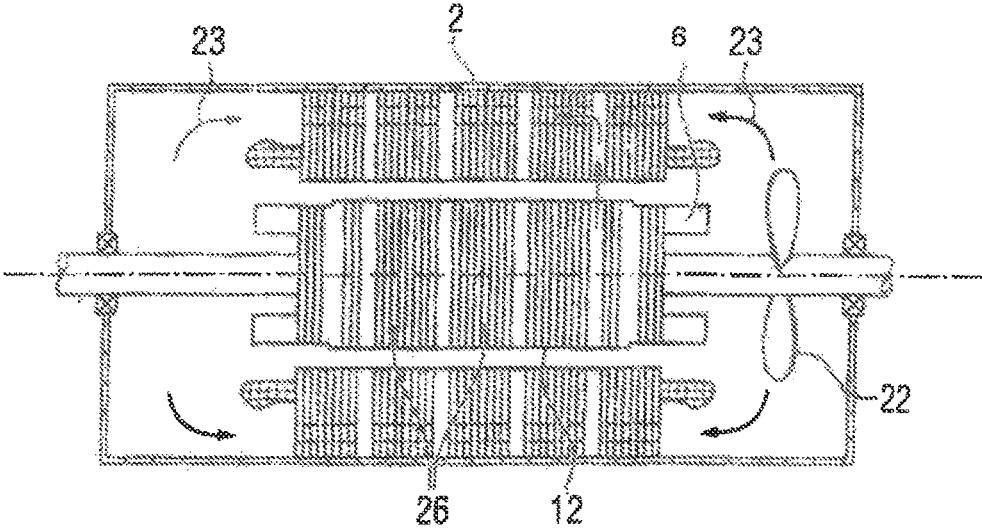

Machines of this kind according to FIG. 7 or FIG. 8 have axially continuous magnetically conductive bodies for rotor 5 and stator 2, or they are formed of partial base laminated cores 26, in order to thus also obtain radial cooling.

In this context, air currents 23 are conducted through the dynamoelectric machine or a closed-off inner cooling circuit is present. The air currents 23 are provided by a shaft-mounted fan 22 and/or separately driven fan.

These partial base laminated cores 26 also form the base body 12, i.e. the material removal described above does not take place there.

The invention can also be used for staggered rotors.

The invention claimed is:

1. A rotor of a rotary dynamoelectric machine, said rotor comprising:
 a magnetically conductive body including slots that are distributed around a circumference and substantially run axially, said magnetically conductive body including a base body and adjacent to the base body on each end face of the base body at least two further additional bodies, with a first one of the at least two further additional bodies axially directly adjoining the end face of the base body and a second one of the at least two further additional bodies axially adjoining the first one of the at least two further additional bodies, wherein the slots have on each of the end faces of the magnetically conductive body radially exposed slot sections which extend in the second one of the at least two further additional bodies and only for a predetermined axial section in the first one of the at least two further additional bodies, said base body formed by laminations and designed axially continuous or formed of partial base laminated cores, with the first one of the at least two further additional bodies made of homogeneous material and having an axial thickness which corresponds to a multiple of a lamination thickness;
 a squirrel cage including electrical conductors arranged in the slots such that the radially exposed slot sections enable the conductors to move radially outward; and
 short-circuit rings arranged on the end faces of the rotor to electrically contact the conductors.

2. The rotor of claim 1, wherein the first one of the at least two further additional bodies is a disk and the second one of the at least two further additional bodies is a disk and/or a partial laminated core.

3. The rotor of claim 1, wherein the base body includes a disk on each of the end faces thereof, with a predefinable axial section with axially exposed slots and a further disk and/or a partial laminated core with exposed slots.

4. The rotor of claim 1, further comprising a torque-generating structure of a synchronous machine, a permanent magnet and/or a structure generating a reluctance torque.

5. A method for producing a rotor of a rotary dynamo-electric machine, comprising:
 producing a magnetically conductive body with slots that are distributed around a circumference and substantially run axially;
 adjoining a first one of at least two further additional bodies axially directly against an end face of the magnetically conductive body and a second one of the at least two further additional bodies axially adjoining the first one of the at least two further additional bodies;
 producing a squirrel cage with electrical conductors that are arranged in the slots and electrically contacted on two end faces of the rotor by short-circuit rings; and
 removing material starting axially from the end faces of the rotor on a radially outer edge, such that the slots have radially exposed slot sections to enable the conductors to move radially in a region of the radially outer edge, with the radially exposed slot sections extending in the second one of the at least two further additional bodies and only for a predetermined axial section in the first one of the at least two further additional bodies.

6. The method of claim 5, wherein the magnetically conductive body is axially constructed of a base body and the first and second ones of the at least two additional bodies.

7. The method of claim 5, wherein the conductors of the squirrel cage are produced by die casting or centrifugal casting.

8. The method of claim 5, further comprising:
 closing the slots of the base body before removing the material; and
 die casting the conductors.

* * * * *